C. S. HASCALL.
NUT LOCK.
APPLICATION FILED NOV. 21, 1914.

1,150,362.

Patented Aug. 17, 1915.

Witnesses
W. N. Wooden.
J. H. Johnston.

Inventor
C. S. Hascall
By
H. A. Stacey, Attorney

UNITED STATES PATENT OFFICE.

CHARLES S. HASCALL, OF PROVIDENCE, RHODE ISLAND.

NUT-LOCK.

1,150,362.

Specification of Letters Patent.

Patented Aug. 17, 1915.

Application filed November 21, 1914. Serial No. 873,355.

*To all whom it may concern:*

Be it known that I, CHARLES S. HASCALL, citizen of the United States, residing at Providence, in the county of Providence and State of Rhode Island, have invented certain new and useful Improvements in Nut-Locks, of which the following is a specification.

This invention relates to new and useful improvements in nut locks and has as its primary object to provide a means for positively locking the nut upon the bolt which in use, may be readily applied and as easily removed, and which will be adapted to lock the nut upon the bolt at any point in its turning movement thereon.

The invention has as a further object to provide a nut lock which may be applied to a conventional type of nut without the necessity of structural change therein, and which will be composed of few and simple parts to thus comprehend an inexpensive construction. And a still further object of the invention is to generally improve the construction and increase the efficiency of devices of the above described character.

With these and other objects in view, my invention will be more fully described, illustrated in the accompanying drawings and then specifically pointed out in the claims which are attached to and form a part of this application.

Figure 1:
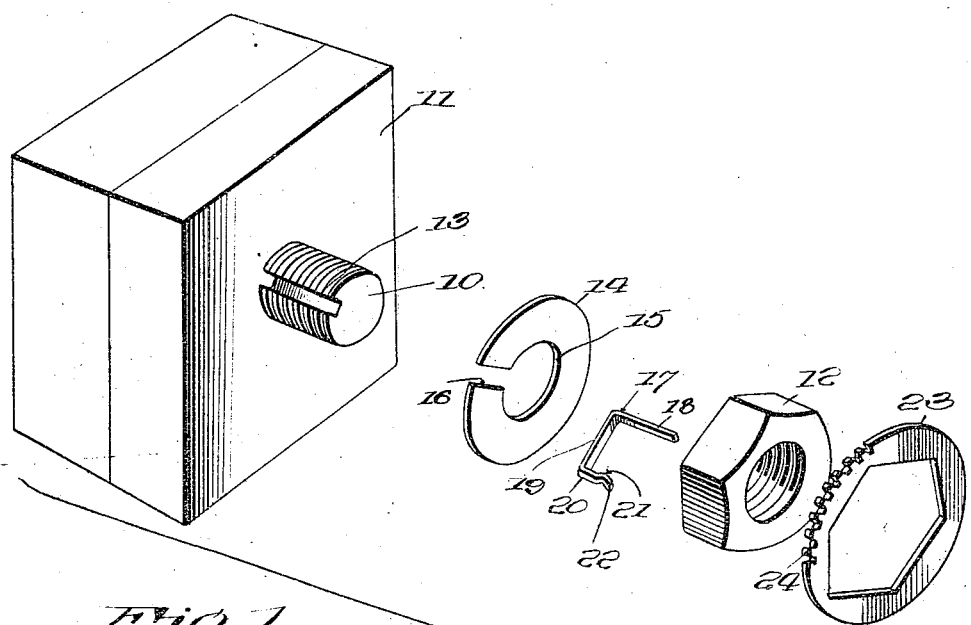
Figure 2:
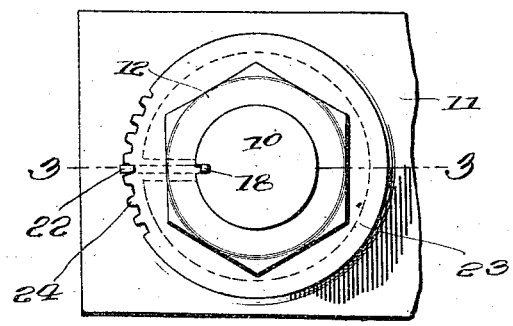
Figure 3:
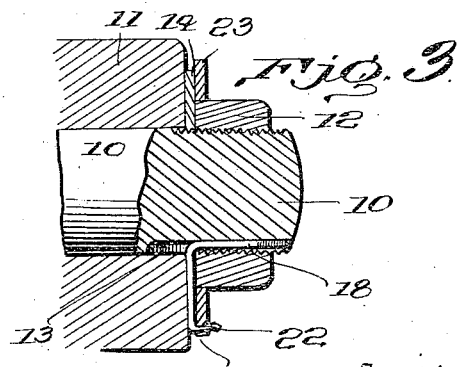

In the accompanying drawings, Figure 1 is a perspective view of my improved nut lock showing the parts thereof detached but in proper operative position. Fig. 2 is a top plan view showing the parts of the nut lock assembled upon the bolt and illustrating the manner in which the locking key is disposed to engage the locking washer provided, and Fig. 3 is a fragmentary sectional view more particularly illustrating the arrangement of the locking key employed and the manner in which it co-acts with the locking washer.

Corresponding and like parts are referred to in the following description and indicated in all the views of the drawing by the same reference characters.

In carrying out my invention, I employ a bolt 10, which in the drawings, has been illustrated in position within the work conventionally shown at 11. The bolt 10 may be of any conventional type and is screw threaded adjacent one extremity to receive the nut 12. Formed in the bolt 10 and traversing the threaded portion thereof, is a longitudinally extending groove or seat 13, the said groove opening through the end of the bolt. The purpose of this groove will presently appear. Disposed for detachable connection with the bolt 10 and arranged to seat against the work, is a flat washer 14 which is provided with a smooth bore 15 to loosely receive the bolt and communicating with said bore and opening through the peripheral margin of the washer upon one side thereof, is a radially extending slot 16.

I further employ a locking key 17 which is preferably formed from a single length of suitable resilient material and which includes a substantially straight shank 18 which is bent at one extremity at substantially right angles to provide a base 19 which is also substantially straight. At the outer extremity of the base 19 opposite the shank 18, the length of material is again bent at substantially right angles to the said base inwardly toward the shank 18 and in substantial alinement therewith, to provide a dog or catch 20, the shank of which adjacent its free end is provided with a laterally projecting shoulder 21 extending inwardly toward the shank 18, the adjacent terminal of the shank being thence again deflected outwardly away from the shank 18 as shown at 22.

The key thus formed is disposed to detachably engage the bolt, with the shank 18 thereof seating within the groove 13, and with the base 19 extending radially through the slot 16 of the washer 14, the dog 20 being thus disposed to project outwardly away from the work. The particular disposition of the locking key 17 is best shown in Fig. 3 of the drawings.

After assembling the washer 14 upon the bolt 10 in the manner described, and arranging the key 17 to engage within the groove 13, as above set forth, the nut 12 is applied, it being understood that the groove 13 is of such depth as to receive the shank 18 of the key so that when the nut 12 is screwed down upon the bolt to engage the work, the said nut will consequently maintain the key in engagement with the bolt.

Disposed for detachable connection with the bolt 12 and arranged to coact with the key 17 is the locking member 23, the said locking member being in the form of a flat washer having a central opening formed therein to receive the nut 12 which opening is provided with sides disposed to engage the flat sides of the nut. The locking member 23 is preferably provided with an annular outer edge and formed in the said edge, upon one side of the said member is a series of circumferentially extending radially projecting teeth 24, the said teeth preferably extending throughout a portion of the margin of the member circumferentially thereof, equal to at least as many degrees as are included by one flat side of the nut 12.

The nut being applied to the bolt in the manner set forth, the locking member 23 is positioned over the nut with the teeth 24 thereof disposed for engagement with the dog 20 of the key 17. As best shown in Fig. 3 of the drawings, the dog 20 is so arranged as to engage between the teeth 24 of the locking member 23 with the shoulder 21 extending inwardly over the outer face of the member, it being understood that when applying the member 23, the said member upon coming in contact with the shoulder 21 of the dog 20 will spring the said dog outwardly away from the nut 12 to permit the member to seat against the adjacent outer face of the member 23.

The key 17 is thus disposed to operatively connect the nut 12 with the bolt 10 to prevent retrograde movement of the nut and attention is called to the fact that no structural change in the nut is required. Furthermore, since the shank 18 of the key 17 may fit loosely within the groove 13 and since the slot 16 is wider than the base 19 of the said key, slight turning movement of the key will be permitted so that in the event should the dog 20 fall into alinement with any of the teeth 24 of the locking member 23 upon the application of the said member to the nut 12, the said key may be turned within the seat 13 and within the slot 16 to one side or the other a sufficient distance to permit the dog 20 to engage between the adjacent teeth. While this slight turning movement of the key 17 within the groove 13 will permit a slight retrograde movement of the nut 12, in use, still such movement will not be of such a degree as to affect the thorough efficiency of the device.

It will further be noted that since the teeth 24 extend circumferentially of the locking member 23 a distance equal to as many degrees as are included by one flat side of the nut 12, the said nut may be locked upon the bolt at any point in its turning movement thereon. In this connection attention is directed to the fact that the locking member 23 will be held in position upon the nut 12 by the dog 20 of the key 17, the said dog, through its resilient action, normally engaging the said locking member with the shoulder 21 of the dog projecting over the outer face of the locking member. This is an important feature of advantage since the dog 20 through such arrangement, serves the dual function of operatively connecting the nut 12 with the bolt and of also maintaining the locking member 23 in position upon the nut. In order to effect a release of the locking member 23, whence the nut 12, the key 17, and the washer 14 may be readily removed from the bolt as will be readily understood, a screw-driver or other tool may be inserted beneath the member 23 adjacent the dog 20 and the said member pried outwardly to ride over the shoulder 21 out of engagement with the said dog.

It will therefore be seen that I provide a very simple and efficient construction for the purpose set forth wherein but few and simple parts are employed which may be cheaply manufactured and wherein the said parts will coact to positively lock the nut upon the bolt at any point in its turning movement. It will further be seen that when it is desired, the locking means may be readily detached to effect the removal of the nut to be again used as occasion may demand.

What is claimed as new is:—

1. The combination with a bolt disposed to receive a nut and provided with a seat, of a key operatively engaging in the seat and extending beneath the nut, the said key being provided with an upstanding dog having an inwardly extending shoulder formed thereon, and a locking member fitting over the nut and engaging said dog with the said shoulder projecting inwardly over the outer face of the said member.

2. The combination with a bolt having a seat formed therein and disposed to receive a nut, of a washer fitting over the bolt and having a radially extending slot formed therein, a key including a shank engaging in said seat and a base extending through said slot, the said base having an upstanding dog formed thereon provided adjacent its free extremity with an inwardly projecting curved shoulder, and a locking member fitting over the nut and having a plurality of circumferentially spaced teeth formed in the outer edge thereof and upon one side of the member, said teeth engaging said dog with the shoulder of the dog extending inwardly over the outer face of the locking member to thereby retain the said member in position upon the nut.

3. The combination with a bolt having a seat formed therein and disposed to receive a nut having flat sides, of a key engaging in said seat and provided with an upstanding dog having an inwardly projecting shoulder formed thereon, and a locking member fitting over the nut and having a plurality of circumferentially spaced teeth formed in the outer edge thereof and upon one side of the said member disposed for engagement with said dog with the shoulder of the dog engaging over the outer face of the said member, the said teeth extending circumferentially of the locking member a distance not less than as many degrees as are included by one flat side face of the nut.

4. The combination with a bolt disposed to receive a nut and provided with a seat, of a key operatively engaging in said seat and having a dog formed thereon, and a locking member fitting over the nut and coöperating with the dog, the dog being adapted to yieldably engage said member.

5. The combination with a bolt disposed to receive a nut and provided with a seat, of a key operatively engaging in said seat, and a locking member engaging the nut and adapted for detachable coöperative engagement with said key.

6. The combination with a bolt disposed to receive a nut and provided with a seat, of a key operatively engaging in said seat and provided with a dog arranged substantially parallel to the longitudinal axis of the bolt, and a locking member engaging the nut and mounted concentrically to the said axis, the locking member being adapted for detachable coöperative engagement with said dog.

7. The combination with a bolt disposed to receive a nut and provided with a seat, of a key mounted in said seat eccentrically to the longitudinal axis of the bolt, and a locking member engaging the nut and mounted concentrically to the said axis, the locking member being adapted for coöperative engagement with the key.

In testimony whereof I affix my signature in presence of two witnesses.

CHARLES S. HASCALL. [L. S.]

Witnesses:
 MARY E. HASCALL,
 EBEN HILL.

Copies of this patent may be obtained for five cents each, by addressing the "Commissioner of Patents, Washington, D. C."